J. Tyler,
Stock Barn.
No. 106,025.   Patented Aug. 2. 1870.

Witnesses.   Inventor:
Joel Tyler
per
Alexander Mason
Atty

United States Patent Office.

JOEL TYLER, OF NEW CARLISLE, OHIO.

Letters Patent No. 106,095, dated August 2, 1870.

---

IMPROVEMENT IN STOCK-BARNS.

---

The Schedule referred to in these Letters Patent and making part of the same.

---

*To all whom it may concern:*

Be it known that I, JOEL TYLER, of New Carlisle, in the county of Clark and in the State of Ohio, have invented certain new and useful Improvements in Stock-Barns; and do hereby declare that the following is a full, clear, and exact description thereof, reference being had to the accompanying drawing and to the letters of reference marked thereon making a part of this specification.

The nature of my invention consists in the construction and arrangement of a "stock-barn," as will be hereinafter fully set forth.

In order to enable others skilled in the art to which my invention appertains to make and use the same, I will now proceed to describe its construction and operation, referring to the annexed drawing, in which—

A represents the frame-work of my barn, being divided longitudinally by upright posts, in such a manner as to form three distinct and separate compartments.

The rear compartment is divided transversely into as many sections as may be desired, each section having a sliding door, B, at the rear side of the barn.

Figure 1:
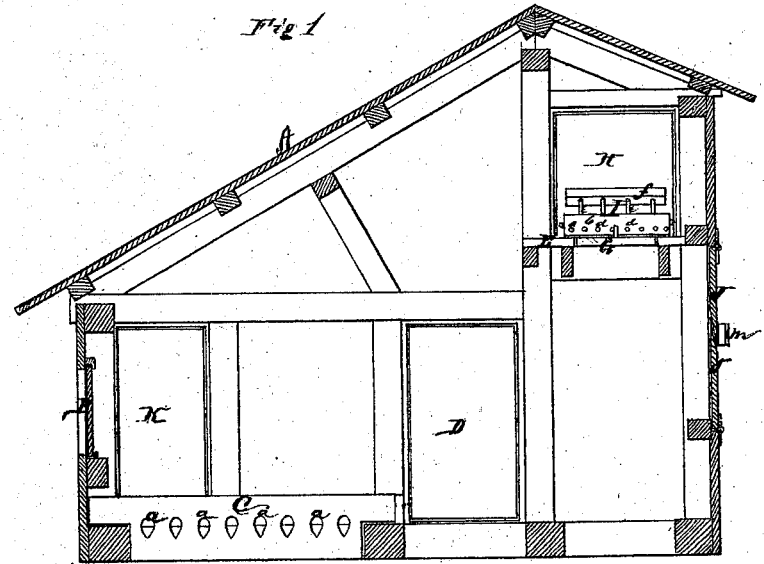
Figure 1 is a transverse vertical section of my barn.

Between the sections of the rear compartment are placed feed-racks, C, consisting of boards, provided with openings, $a$ $a$, as seen in fig. 1, just large enough to admit the heads of the sheep.

From the rear side of the barn the cattle-yard should be fenced off, so as to keep the sheep of each flock separate, the doors B B allowing the sheep to pass in and out of their respective sections. This portion of the barn may be readily fixed up in any desired manner to suit any kind of cattle.

The central longitudinal compartment of the barn is provided with a door, D, at each end, so that a cart can be driven through, for the purpose of collecting the dung or other dirt in the barn.

The front compartment is for the reception of the hay, and is provided with a roof or top, E, having a series of trap-doors, G G, through it.

At one end of the barn, directly on a level with the top E, is a door, H, through which the horse dragging the hay is admitted, this end of the barn being placed against the side of a hill, or an inclined walk leading up to the same.

I represents the rake or hay-carrier, consisting of a head, $b$, of suitable size to pass through the door H.

Figure 2:
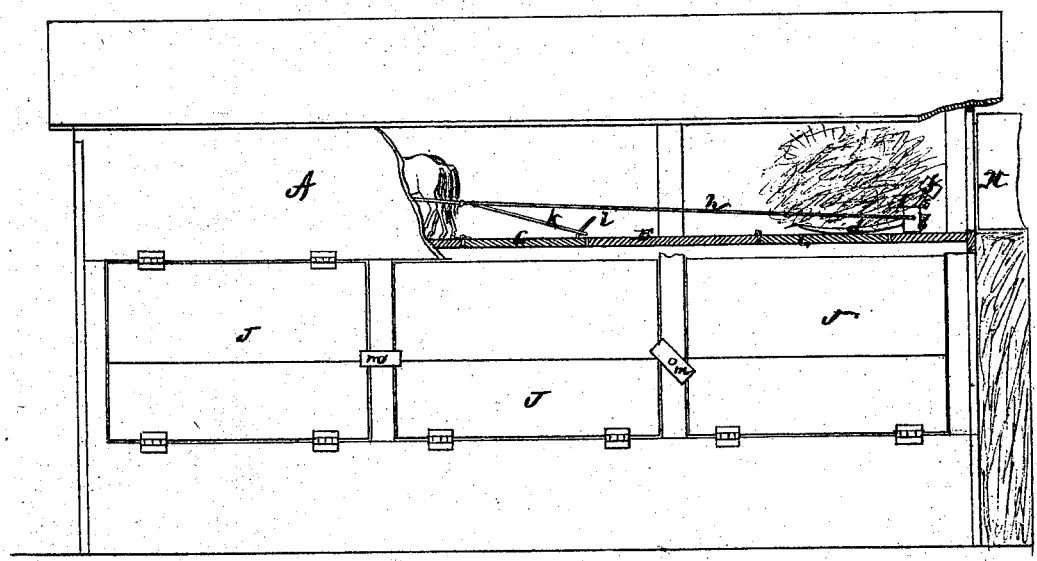
Figure 2 is a front view, part in section.
Figure 3:
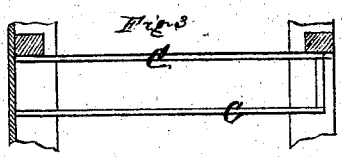
Figure 3 is a plan view of one of the sheep-stalls.

This head is, on the front side, provided with a series of teeth, $d$ $d$, and from its upper rear corner project arms, $e$ $e$, which are inclined backward, and support a bar, $f$, as shown in fig. 2.

To the ends of the head $b$ are attached ropes or chains, $h$ $h$, to the outer ends of which the horse is attached, said chains or ropes forming a loop, $k$, in rear of the horse, which, as the horse travels on the top E, catches on an inclined pin, $i$, placed in one of the trap-doors H, turning the same over, and allowing the hay carried forward by the rake I to fall down through the top E.

The pin $i$ may be changed from one trap-door to another, so as to deposit the hay in any part of the mow desired.

On the front side of the barn is a series of folding doors, J J, held down by buttons $m$ $m$, as shown in fig. 2.

One of these doors is hinged at the upper edge, and the other at the lower edge, so that one opens upward, and the other downward.

The edges of the doors J J that meet are beveled, as shown in fig. 1, the edge of the top door lapping over that of the lower door.

The front compartment of the barn, constructed as above described, for sheep or cattle, is provided at each end with a door, K, for convenience in cleaning.

Having thus fully described my invention,

What I claim as new, and desire to secure by Letters Patent, is—

1. A stock-barn, constructed as described, so as to form three longitudinal compartments, on the front side for the hay, on the rear side for the stock, and an alley in the center, substantially as and for the purposes herein set forth.

2. A hay-loft or barn, having in its top a series of trap-doors, to pass the hay down at any point desired, substantially as herein set forth.

3. The trap-doors G G, provided with a movable pin, $i$, and operating in connection with the top K and hay-carrier I, substantially in the manner and for the purposes herein set forth.

4. The folding doors J J, constructed and arranged as described, so that one opens up and the other down, and the edges that meet lap over, substantially as herein set forth.

5. The construction and arrangement of a stock-barn with three longitudinal compartments, having the top E, with trap-doors G G, feed-racks C C, and doors B, D, H, J, and K, all substantially as and for the purposes herein set forth.

In testimony that I claim the foregoing, I have hereunto set my hand this 2d day of April, 1870.

JOEL TYLER.

Witnesses:
A. H. MARR,
C L. EVERTS.